May 7, 1968 R. C. SPAIN 3,381,745
APPARATUS FOR DIE CASTING KEY PLUGS
Filed Aug. 24, 1965 6 Sheets-Sheet 1
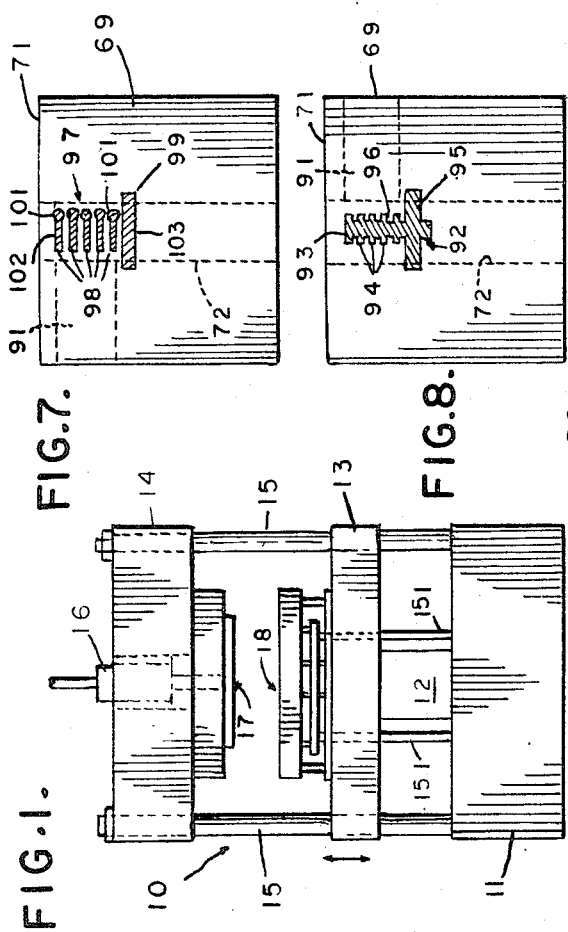
Inventor:
Roy C. Spain
By Wilson & Geppert
Attorneys

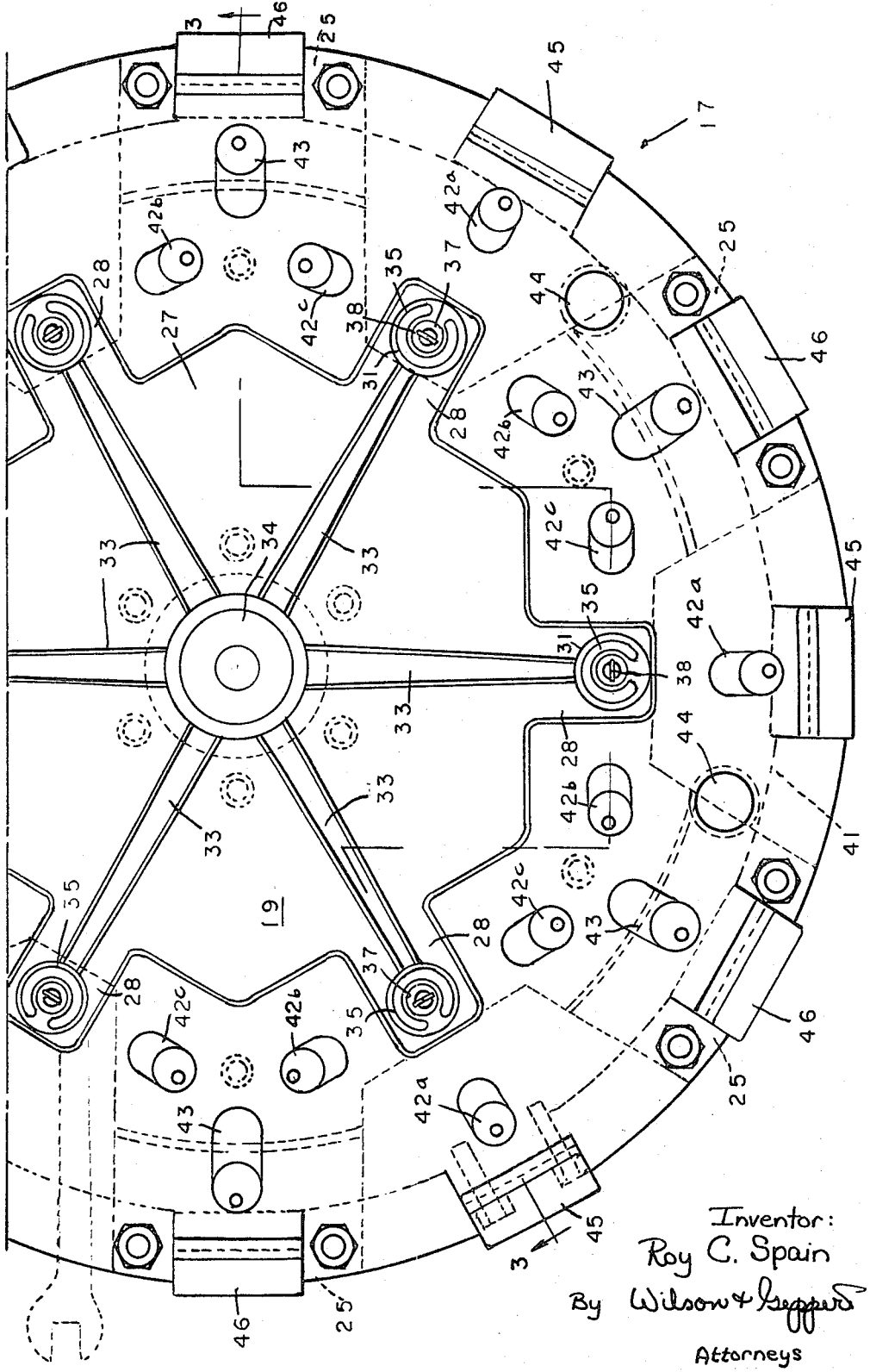

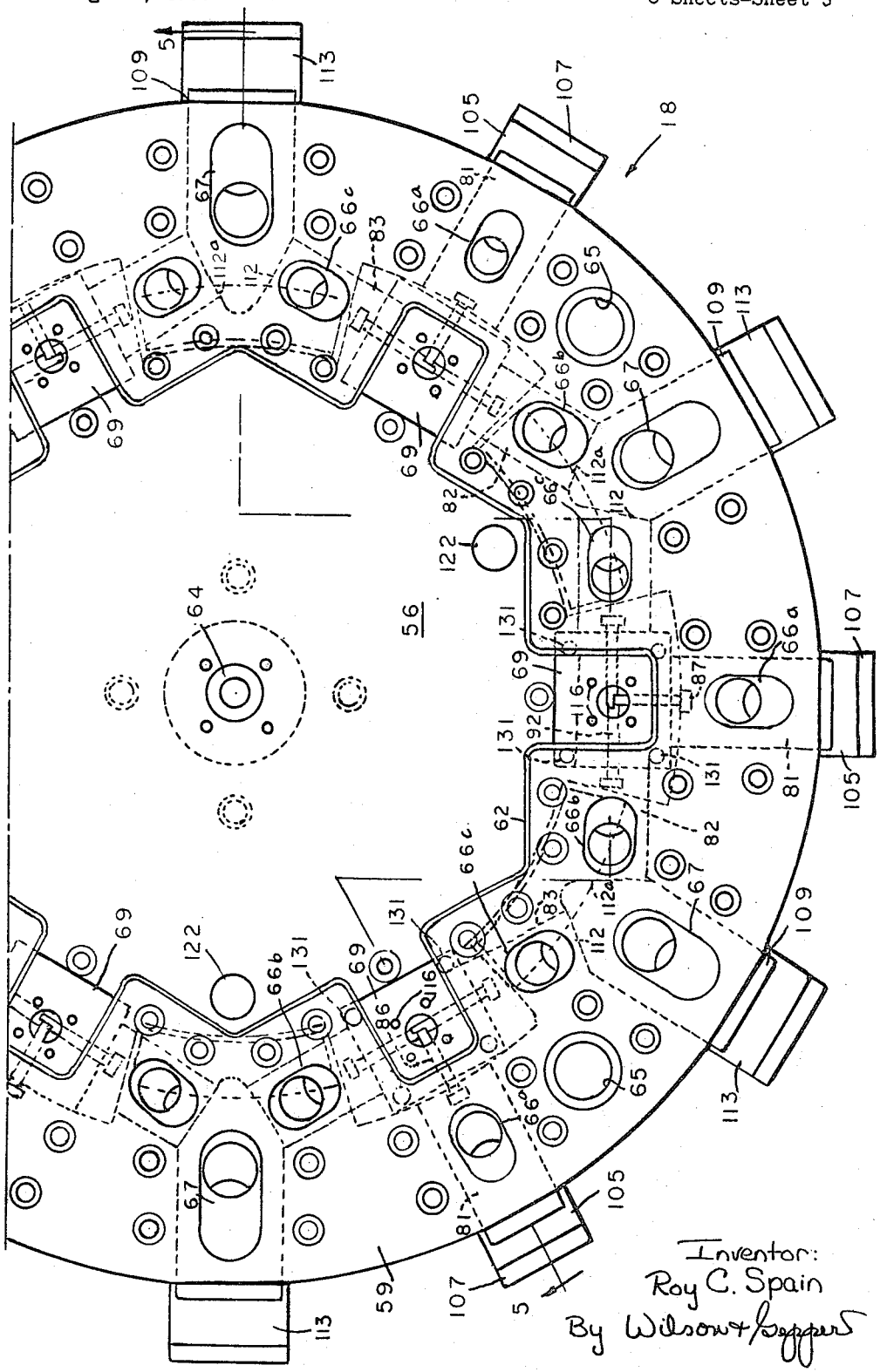

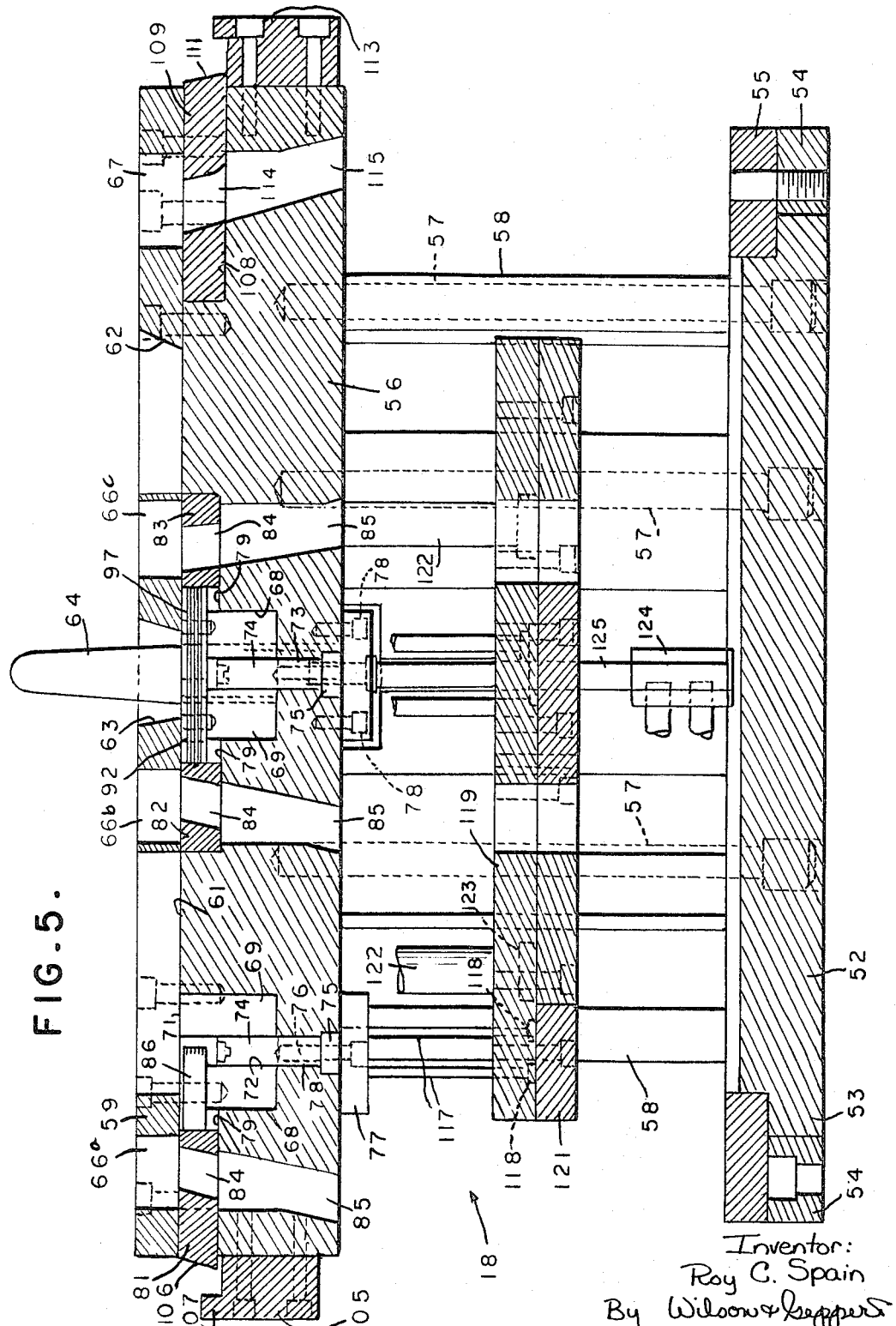

May 7, 1968 R. C. SPAIN 3,381,745
APPARATUS FOR DIE CASTING KEY PLUGS
Filed Aug. 24, 1965 6 Sheets-Sheet 5

Inventor:
Roy C. Spain
By Wilson & Geppert
Attorneys

May 7, 1968  R. C. SPAIN  3,381,745
APPARATUS FOR DIE CASTING KEY PLUGS
Filed Aug. 24, 1965  6 Sheets-Sheet 6

Inventor:
Roy C. Spain
By Wilson & Geppert
Attorneys

United States Patent Office 3,381,745
Patented May 7, 1968

3,381,745
APPARATUS FOR DIE CASTING KEY PLUGS
Roy C. Spain, Salem, Va., assignor to National Lock Co., Rockford, Ill., a corporation of Delaware
Filed Aug. 24, 1965, Ser. No. 482,248
12 Claims. (Cl. 164—303)

ABSTRACT OF THE DISCLOSURE

A die casting apparatus for the manufacture of plugs for key lock assemblies which will provide the intricate slotting in the plug in a single casting operation utilizing a multi-cavity two-part separable mold with each mold cavity formed by an upper mold core having a circular recess with a central plate depending therefrom and a lower die block having a cylindrical cavity with a rear core, a side core, a core forming the keyway and an opposing core nest.

---

The present invention relates to apparatus for die casting plugs of key-operated lock assemblies and more particularly to a novel multi-cavity die casting mold for forming the key plug and its intricate slotting in a single operation.

In the formation of rotatable key plugs utilized for tumbler lock assemblies, the formation of the keyway and the slots for the tumbler plates and their springs requires multiple operations using a lathe and/or milling machine to drill or broach out the slots and cavities required for the plug. This intricate machining requires a substantial amount of time and expense. The present invention relates ot a multi-cavity die casting mold for making a plurality of the key plugs in a single operation with the only extra operation being the removal of any flash or sprue. This die casting operation provides a fast and economical method and manner of production which is adaptable to high speed production methods.

Among the objects of the present invention is the provision of apparatus for die casting a key plug utilizing a multi-cavity, two-part separable mold in a conventional die casting apparatus. The two parts of the mold are mounted on reciprocable die platens of a die casting machine with the upper mold back-plate secured to the upper platen through retainer blocks and a clamp ring and the lower mold member mounted spaced from an ejector housing base which is secured to the lower platen through a retainer ring and clamp ring. The spacing between the lower mold member and the ejector housing base accommodates the ejector pin assembly for reciprocation when the mold members are open.

Another object of the present invention is the provision of a multi-cavity two-part mold having a plurality of cavities in the lower mold member; each cavity receiving a die block having a central passage therethrough determining the diameter of the plug and adapted to receive a head core at one end from the upper mold member and a rear core at the other end to limit the length of the plug. The die block also contains a series of lateral passages intersecting the main central passage for side cores to form various passages or slots in the plug. The die block is retained in the lower mold member through a retainer block overlapping a portion of the die block and providing a cavity for the head core.

A further object of the present invention is the provision of a multi-cavity two-part mold having a plurality of reciprocable side cores which move into the die cavity as the mold members approach each other. The reciprocable side cores include a side core to cast the ward in the keyway and a core nest on each adjacent side, the side core to provide the slots for the tumbler plates in the plug and the springs to return the tumbler plates to inoperative or locked position. One of the core nests also provides the slot utilized for the keyway in the plug. These side cores come together within the mold cavity in a nested position to fully form all necessary slots and recesses in the plug.

The present invention also comprehends the provision of an upper mold member providing the sprue passages from a central inlet or nozzle to direct the die casting material to the die cavities. The upper mold member also carries the head core for the die cavity for reciprocable movement toward and away from the die cavity in the lower mold member and a plurality of camming members to actuate the side cores for movement into and out of the mold cavity as the mold members close and open. These camming members cooperate with actuating blocks or links attached to the side cores. The upper mold member may also provide guide pins which are received in pin bushing in the lower mold member to properly align the mold members relative to each other when they close for a die casting operation.

The present invention further comprehends the provision of a die casting apparatus having a plurality of ejector pins surrounding the central mold cavity and contacting the sprue material to eject the sprue and formed key plug integral therewith. The sprue is formed in radial channels from a central source with each channel communicating with a mold cavity through a generally annular channel at the end of the main channel; the annular channel having one or more small radial passages leading into the cavity. Also, the ejector plate actuating the ejector pins actuates a plurality of pushback pins which are normally flush with the upper surface of the main mold plate. If the ejector plate does not return to inactive position, the upper die plate contacts the projecting push-back pins as the mold closes to return the ejector plate and ejector pins to their inactive position.

The present invention also comprehends the provision of a die casting apparatus having a plurality of cam locks corresponding to the number of mold cavities which are reciprocated during opening or closing movement of the mold members and when moved inwardly aid in locking and retaining the side core nests in operative position during the die casting operation.

Further objects are to provide a construction of maximum simplicity, efficiency, economy and ease of assembly and operation, and such further objects, advantages and capabilities as will later more fully appear and are inherently possessed thereby.

In the drawings:

FIGURE 1 is a front elevational view of a typical die casting apparatus utilizing the two-part die of the present invention.

FIG. 2 is a partial bottom plan view of the upper die.

FIG. 3 is a vertical cross sectional view of the upper die taken on the irregular line 3—3 of FIG. 2 and looking in the direction of the arrows.

FIG. 4 is a partial top plan view of the lower die with the cores in their operative position.

FIG. 5 is a vertical cross sectional view of the lower die and ejector pin assembly taken on the irregular line 5—5 of FIG. 4.

FIG. 6 is a top plan view of a die block and cores in operative position.

FIG. 7 is a side elevational view of the die block taken from the right side of FIG. 6 with the core shown in cross section.

FIG. 8 is a side view of the die taken from the left side of FIG. 6 with the core shown in cross section.

Figure 11:
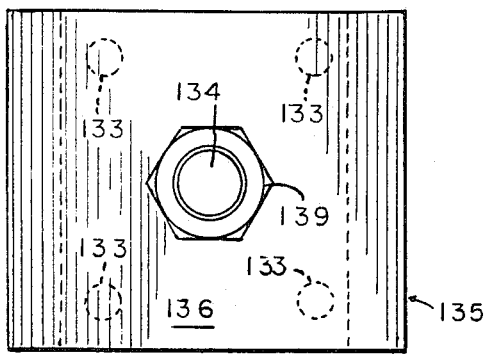
FIG. 11 is a top plan view of the core nest puller for removing the die block from the lower die.

Referring more particularly to the disclosure in the drawings wherein is discolsed an illustrative embodiment of the present invention, FIG. 1 discloses a die casting apparatus 10 in the form of a press having a base 11 housing a reservoir of hydraulic fluid to actuate a ram or piston 12 which reciprocates a lower platen 13 toward and away from a stationary upper platen 14; both platens being mounted on guide rods 15 secured to the base. The upper platen 14 includes a source 13 of molten metal under pressure and utilized to cast the key plugs 141 as is well known in the art.

An upper mold member 17 is secured to the stationary platen 14 and a lower mold member and ejector assembly 18 is secured to the lower reciprocable platen 13. The upper mold member 17 includes a mold plate or die 19 which is secured to a back plate 21 through securing means such as cap screws 22 (FIG. 3). The back plate 21 is in turn secured to the upper platen 14 through a retainer ring 23 which surrounds the flange 24 on the peripery of the back plate and a plurality of clamps 25 which are secured to the retainer ring 23 and overlap the flange 24 and extend into recesses 26 in the back plate 21. The ring 23 is secured to the upper platen 14.

The mold plate or die 19 includes a lowered central portion 27 (FIG. 3) having a plurality of radial areas 28 (FIG. 2) containing sockets 29 for reception of head cores 31 which are retained in the sockets by cap screws 32. A radial sprue passage or runner 33 is formed in the portion 27 extending from a central opening 34 outwardly to each head core 31 (FIG. 2). The runner terminates in a substantially annular channel 35 around the core and having one or more shallow radial passages 36 from the channel 35 into a circular recess 37 forming the outer flange of the key plug.

The head core 31 includes the circular recess 37 and a central plate 38 which is retained in the core through a transverse retainer pin 39. The plate 38 extends into the central circular recess and slightly beyond the head core to form the outer end of the keyway in the key plug. The plate may be provided with a suitable configuration for the keyway, wards, etc. in the key plug. The lower surface of the head core 31 is positioned flush with the surface of the portion 27 and can be easily removed or exchanged by loosening the cap screw 32 with an open end wrench (shown in dotted lines in FIG. 2) inserted into the recess 41 formed in the back plate 21. Rotation of the screw 32 will jack the head core 31 out of the die or mold plate 19.

Outside of the lowered portion 27 of the die 19 are a plurality of camming pins which cooperate with actuator members in the lower mold member 18. Camming pins 42$^a$, 42$^b$ and 42$^c$ are positioned on the three sides of the area 28 and head core 31 with the pins all slanting outward away from the head core 31 which the pins surround. Also, camming pins 43 are positioned intermediate adjacent head cores 31, but outwardly thereof, and guide pins 44 extend from the die 19 to aid in aligning the mold members upon closing.

Secured to the outer periphery of the die 19 in a slanted arrangement as shown in FIG. 3 are a plurality of die locks 45; each lock corresponding to and radially aligned with one of the head cores 31. Alternately arranged with the die locks 45 on the periphery of die 19 are a plurality of cam locks 46 whose function will become evident later. Both the die locks 45 and cam locks 46 are secured to the tapered periphery 47 of the die 19 by a number of cap screws 48. The die locks 45 and cam locks 46 each have a locating or positioning ridge 49 which is received within a positioning groove 51 in the periphery 47 of die 19 (FIG. 3).

The lower mold member and ejector assembly 18 (FIG. 5) includes an ejector housing base 52 having a clamping flange 53. An annular retainer ring 54 surrounds the periphery of the flange 53 and is secured to the lower platen 13 (FIG. 1) by suitable securing means such as cap screws. An annular clamp ring 55 overlies the flange 53 and the retainer ring 54 and is suitably secured to the retainer ring 54 to clamp the base 52 onto the platen 13.

Spaced above and rigidly secured to the base 52 (FIG. 5) through a plurality of elongated screws 57 is the lower die 56, the screws being surrounded by spacer sleeve 58 abutting the base 52 and the die 56. A retainer block 59 is secured to the upper surface 61 of the die 56 by suitable means such as cap screws, and the block 59 has a central opening 62 complementary to the lowered portion 27 of the upper die 19 (FIG. 3) to receive this portion 27 therein; the opening 62 including downwardly tapered radial pockets 63 to receive the arms 28 containing the head cores 31. A central tapered projection or sprue post 64 mounted in the die 56 extends into the central opening 34 in the die 19 when the dies are closed to distribute the molten metal from its source 16 to the radial sprue runners 33.

The block 59 also contains pin bushings 65 (FIG. 4) aligned with openings in the die to receive the guide pins 44 of the upper die 19. Further, the block 59 contains elongated openings 66$^a$, 66$^b$, 66$^c$ and 67 which receive the camming pins 42$^a$, 42$^b$, 42$^c$ and 43, respectively, of the upper die 19.

The lower die 56 has a plurality of recesses 68 (FIG. 5) in the upper surface 61 to receive die blocks 69 therein; the recesses and die blocks being vertically aligned with the radial pockets 63 in block 59, and the sockets 29 and head cores 31 of the upper die 19 (FIG. 3). The top surface 71 of each die block 69 is flush with the upper surface 61 of the die 56, and the block 59 overlaps the blocks 69 to retain them in the die 56. The sides of the blocks 69 may be undercut as shown for easy removal.

Figure 15:
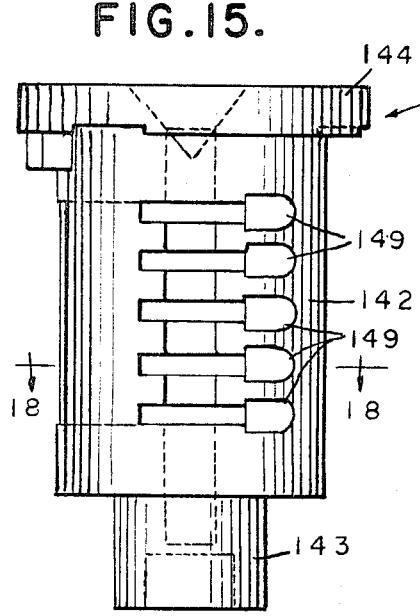
FIG. 15 is an enlarged side elevational view of the key plug formed by the die of the present invention.
Figure 16:
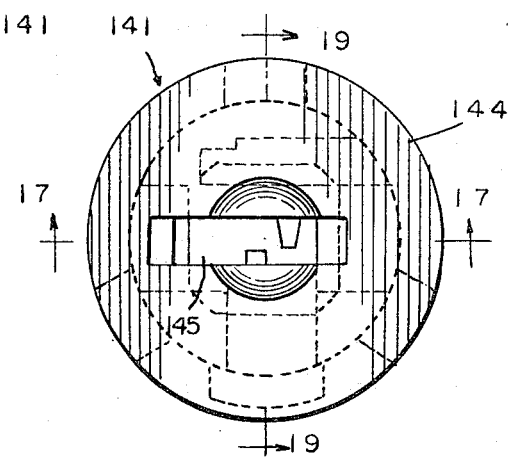
FIG. 16 is a front elevational view of the key plug of FIG. 15.
Figure 17:
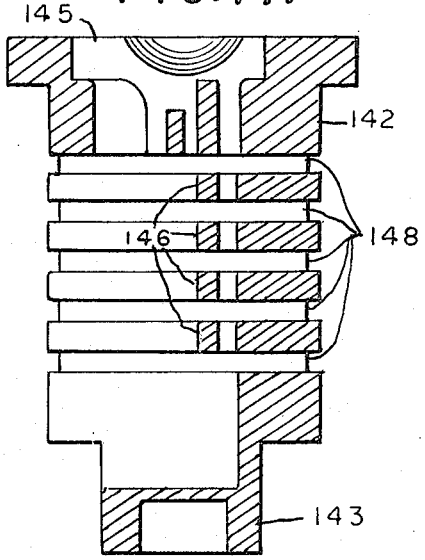
FIG. 17 is a cross sectional view taken on the line 17—17 of FIG. 16 and looking in the direction of the arrows.

The die block 69 has a central vertical cylindrical passage 72 therethrough aligned with a counterbored passage 73 formed in the upper die 56. The diameter of the passage or cavity 72 determines the diameter of the key plugs being cast, and the upper surface 71 of the die block 69 may be recessed at the periphery of the cavity 72 to form desired projections on the back surface of the flange of the key plug 141 (FIG. 15). A rear core 74 having an enlarged end 75 is inserted into the passage 73 of the die and extends into the passage 72 in the die block 69 to determine the overall length of and rear configuration of the key plug. The core 74 includes a threaded opening 76 opening at the lower end thereof for a purpose to be later described, and a rear core back-up plate 77 is positioned below and abutting the enlarged end 75 of the core and is secured to the die 56 by suitable securing means such as cap screws 78. (FIG. 5).

On three sides of the recess 68 are relatively shallow recesses 79 for generally rectangular actuator blocks 81, 82 and 83. The recesses have sufficient length to allow longitudinal reciprocation of the blocks 81, 82 and 83 under the influence of camming pins 42$^a$, 42$^b$ and 42$^c$. Each block has a slanted passageway 84 therethrough to conformably receive one of the camming pins 42ª, 42ᵇ or 42ᶜ. when the dies close to cam the block into operative position. Also the die 56 below each block 81, 82 and 83 has an enlarged slanted passageway 85 to receive the end of the camming pin extending through the block. (FIG. 5).

Figure 9:
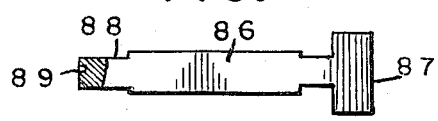
FIG. 9 is a top plan view partially in cross section of the side core from the ward in the key plug.
Figure 10:
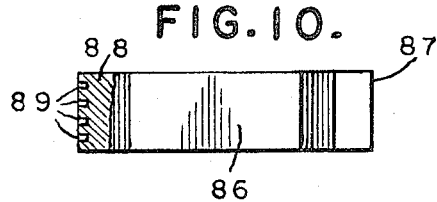
FIG. 10 is a side elevational view partially in cross section of the side core of FIG. 9.

The actuator block 81 is connected to a side core 86 by a T-slot and T-head connection 87 (FIGS. 4, 6, 9 and 10), and the side core 86 includes a reduced end 88 having a plurality of vertically aligned depressions 89 to cast the ward in the keyway of the key plug (FIGS. 9 and 10). The core is inserted into the mode cavity in the die block 69 through a passageway 91 in one wall thereof (FIGS. 6, 7 and 8). The actuator block 82 actuates a core 92 having a vertical rectangular body 93 with a series of vertically spaced flanges or fins 94 projecting from each side of the body 93 and a wider horizontal portion 95 adjacent the lower end of body 93 (FIG. 8). This core is received in a complementary passageway 96 in the die block 69.

The actuator block 83 actuates a core nest 97 which consists of a series of vertically spaced plates 98 and a lower thicker and wider plate 99 (FIG. 7). The plates 98 having longitudinal bulges 101 adjacent one edge on both top and bottom surfaces of the plate to form passages for tumbler springs (not shown). This core nest 97 is received in complementary slots 102 and 103 in the die block. As clearly seen in FIG. 6, the side core 86 extends approximately halfway into the passage 72 and the core 92 abuts the side of the side core 86 with its inner end. The plates 98 are horizontally aligned with the fins 94 on the core 92 and the plate 99 is horizontally aligned with the horizontal portion 95 and positioned below the plane of the side core 86. The plates 98 abut the side core 86 but have portions 104 beyond the end of the side core 86 which project beyond the side core as seen in FIG. 6. The portion 95 and plate 99 form other required recesses or grooves in the key plug.

The lower die 56 is provided with a side core stop 105 (FIGS. 4 and 5) which is secured to the periphery of the lower die 56 and aligned with the outer slanted surface 106 of each actuation block 81; the stop 105 having an upwardly extending flange 107 to limit outward movement of the block 81. The stop 105 is secured to the die 56 through suitable caps screws as shown.

The lower die 56 is also provided with a shallow recess 108 intermediate the blocks 82 and 83 of adjacent die blocks 69 to receive a reciprocable cam lock 109 having a slanted outer end 111 (FIG. 5) and a pair of converging camming edges 112, 112ª (FIG. 4) joined in a rounded end. The camming edge 112 is adapted to engage the outer end of actuator block 83 while edge 112ª engages the outer end of block 82 of the adjacent die block. A stop 113 (FIGS. 4 and 5) is secured to the periphery of the die 56 in the same manner as the stop 105 to limit outward movement of the cam lock 109.

The cam lock 109 is provided with a slanted camming passageway 114 conformably receiving the camming pin 43 which actuates reciprocation of the lock. An enlarged slanted passageway 115 in the die 56 is aligned below the passageway 114 in the lock 109 and the elongated opening 67 in the retaining block 59. Thus, when the cores 92 and core nests 97 are cammed into casting position, the cam lock 109 is also reciprocated inward so that the blocks 82, 83 are locked in casting position.

Each die block 69 is provided with a plurality of passages 116 (four passages shown in FIG. 4) around and parallel to the passage 72 for ejector pins 117; the passages 116 being aligned with the annular channel 35 in the upper die 19 for the casting sprue. The pins 117 extend through aligned passages in the die 56 and extend downwardly to enlarged heads 118 received in an ejector pin retainer plate 119 located between the die 56 and base 52 and within the sleeves 58 for reciprocable motion toward and away from the die by any suitable means. An ejector pin back-up plate 121 is secured to and below the plate 119 to hold the pins 117 in position (FIG. 5).

Also mounted in the retainer plate 119 are three push-back pins 122 having enlarged heads 123 received in suitable openings in the plate 119. The pins 122 extend up through the lower die 56 within the opening 62 in the retainer block 59 with the ends of the pins 122 normally flush with the die surface 61. When the ejector pin retainer plate 119 is actuated upwardly, the push-back pins 122 are also upwardly extended. To retract the ejector plate 119, when the dies approach each other, the lowered portion 27 of the upper die 19 engages the upper ends of pins 122 and pushes back the pins 122, ejector pin retainer plate 119 and the ejector pins 117 to their retracted position.

Also, a water junction 124 is located adjacent the ejector housing base 52 and centrally in the assembly for connection to a source of cooling water and a drain, and conduits or pipes 125 for entrance and exit of cooling water are provided for water circulation in the lower die 56 as is well known in the art.

To change the configuration of the key plug found in the die casting molds, one or more of the dies or cores are changed. To change the key section in the plug, the side core 86 and the head core 31 are changed. To change the side core 86, the side core stop 105 is removed so that the actuator block 81 and side core 86 can slide out of the die. This is the only side core requiring substitution to change key sections. To change the head cores 31, the cap screw 32 is loosened with an open end wrench (shown in dotted outline in FIG. 2) inserted into the recess 41. This cap screw is backed up to engage the back plate 21 and further rotation of the screw will jack the head core 31 out of the die 19. Thereupon the center plate 38 can be changed to alter the key section.

Figure 13:
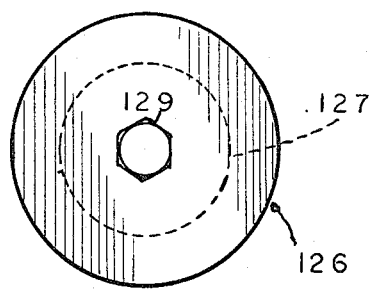
FIG. 13 is a top plan view of a rear core puller for the lower die.
Figure 14:
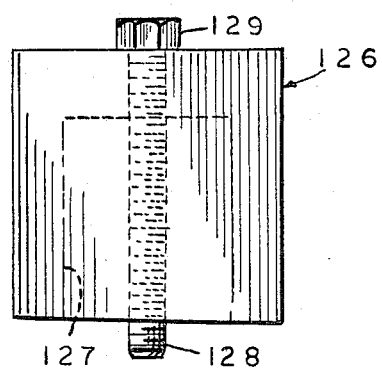
FIG. 14 is a side elevational view of the rear core puller of FIG. 13.

To alter the rear end configuration of the key plug, the rear core 74 is removed. To remove this core, the ejector pin back-up plate 121 is removed so that the ejector pins 117 can be pulled out of the die block 69. Then the back-up plate 77 is removed by removing cap screws 78. A rear core puller consists of a cylindrical block 126 (FIGS. 13 and 14) having a cylindrical recess 127 open at one end and a cap screw 128 extending longitudinally through the block 126 and recess and slightly beyond to threadingly engage the threaded opening 76 in the rear core 74. The enlarged head 129 abuts the solid end of the block 126.

The block 126 is placed with the recess over the rear core 74 and the cap screw 128 is engaged in threaded opening 76. As the block 126 engages the underside of the lower die 56, rotation of the screw 128 draws the rear core 74 downward into the recess 127 to remove the core from the die.

Figure 12:
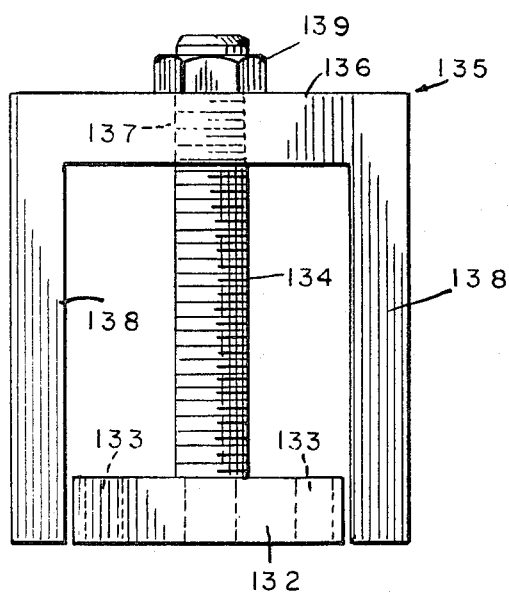
FIG. 12 is a side elevational view of the core nest puller of FIG. 11.

If the core 92 or core nest 97 or die block 69 is to be changed, the cover plate or retainer block 59 is removed. The die block 69 includes threaded openings 131 (FIGS. 4 and 6) adjacent the four corners thereof, and a core puller (FIGS. 11 and 12) includes a generally rectangular plate 132 having openings 133 adapted to be aligned with the openings 131 in the die block 69. Cap screws (not shown) are inserted through the openings 133 and threadingly engage openings 131 in the die block; the enlarged heads of the cap screws abutting the plate 132. Extending upward from and secured in the plate 132 is a threaded shaft or bolt 134 centrally located on the plate.

The core puller also includes a generally U-shaped bracket 135 having a base 136 with a central opening 137 for the shaft 134 and spaced sides 138 which are adapted to contact the upper surface 61 of the lower die 56 on either side of the die block 69. With the plate 132 secured to die block 69, the bracket 135 is positioned with the threaded shaft 134 extending through opening 137, and a nut 139 is threadingly engaged on the shaft. Rotation of the nut 139 draws the shaft 134, plate 132 and die block 69 and core or core nest upward out of the die 56.

FIGS. 15 to 19 disclose a key plug 141 formed in the die casting assembly previously described. The key plug 141 includes a cylindrical body 142 whose diameter is determined by the cylindrical passage 72 in the die block, and having a reduced rear end 143 whose configuration is determined by the rear core 74. The enlarged head or flange 144 of the plug is formed by the recess 37 in the head core 31 and the keyway 145 into the plug is formed by the plate 38.

Figure 18:
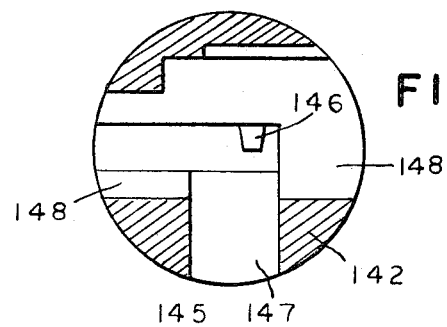
FIG. 18 is a cross sectional view taken on the line 18—18 of FIG. 15.
Figure 19:
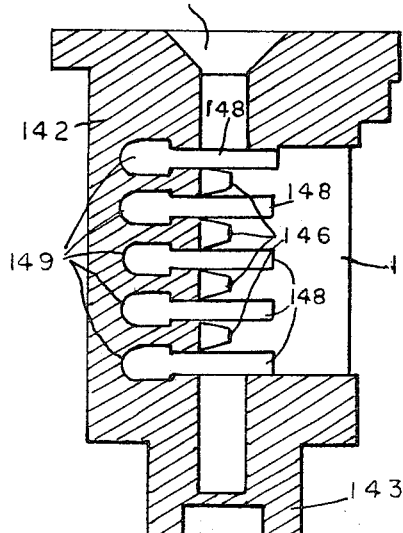
FIG. 19 is a cross sectional view taken on the line 19—19 of FIG. 16.

The wards 146 in the keyway are formed by the depressions 89 in the side core 86 which also form the opening 147. The slots 148 for the plate tumblers and the passages 149 for the tumbler springs are formed by the core 92 and core nest 97. It should be noted that the core nest 97 can be formed with a central vertical body in the same manner as the body 93 for the core 92. FIG. 18 shows a cross section through the body 142 of the plug 141 and further discloses the cooperation required for the placement of side core 86, core 92 and core nest 97; the cores not shown in FIG. 18.

In operation, when the piston ram 12 is actuated, the lower platen 13 is moved upward to cause the lower die 56 to approach the upper die 19. The camming pins 42$^a$, 42$^b$, 42$^c$ and 43 enter the elongated openings 66$^a$, 66$^b$, 66$^c$ and 67, respectively, as the guide pins 44 enter the pin bushings 65. The camming pins 42$^a$, 42$^b$, 42$^c$ enter the slanted passageways 84 in the actuator blocks 81, 82 and 83, respectively, and cam the blocks and their side cores 86, cores 92 and core nests 97, respectively, inwardly so that the cores enter the passage 72 in the die block 69.

Simultaneously, camming pins 43 enter the slanted passageway 114 of the cam lock 109 causing it to move inward so that the camming edges 112, 112$^a$ abut and lock the actuator blocks 82, 83 of adjacent die blocks in position. Also, the lowered or stepped portion 27 of the upper die 19 enters the recess or opening 62 in the lower die 56 and, if the ejector pins 117 and push-back pins 122 extend above the surface 61 of the die 56, the lowered portion 27 contacts the upper ends of the push-back pins 122 to move the ejector pin retainer plate 119, ejector pin back-up plate 121 and ejector pins 117 downward to their inactive position.

The head cores 31 abut the die blocks 69 to form the mold cavity and the sprue runners 33 cooperate with the smooth upper surface 61 of the lower die 56 to form closed channels directing molten metal to the mold cavities. Also the sprue post 64 enters the central opening 34 (FIG. 2) in the upper die 19 to aid in proper distribution of molten metal into the sprue runners 33. The die locks 45 on the upper die 19 engage the slanted outer ends 106 of actuator blocks 81 and the cam locks 46 engage the slanted outer ends 111 of the cam locks 109 to lock the reciprocable side cores 86, cores 92 and core nests 97 within the die cavity in their operative positions for molding; the die locks 45 and cam locks 46 resisting any outward pressure exerted during molding on the cores.

Then molten metal under pressure from the source 16 enters the closed dies through the central opening 34 in the die 19 and passes outwardly through the sprue runners 33, annular channels 35 and into each mold cavity through the shallow grooves or passages 36. The molten metal forms the key plug 141 around the cores and plates which are shown in operative position in FIGS. 4, 5 and 6. Once the mold cavities have been filled, cooling water passes through the water junction 124 and in one conduit 125 for passage through the lower die 56 and out of the other conduit 125 to drain. Once the cast metal has hardened, the ram 12 is retracted withdrawing the lower platen 13 and the lower mold member and ejector assembly 18.

The camming pins 42$^a$, 42$^b$, 42$^c$ and 43 are withdrawn from the lower die 56 and actuate the blocks 81, 82 and 83 to withdraw the side cores 86, cores 92 and core nests 97 from the cast key plug 141, and the cam locks 109 are withdrawn simultaneously with the actuator blocks 82 and 83. Once the cores are fully withdrawn, the ejector pins 117 through the ejector pin retainer plate 119 are actuated to move upward relative to the die 56. A simple manner of actuating plate 119 would be through one or more rods 151 on the base 11 (FIG. 1) and extending through the lower platen 13 and ejector housing base 52 to engage the lower surface of the ejector pin back-up plate 121 as the platen 13 is lowered. As the pins or rods 151 are stationary, lowering movement of the platen 13 causes upward movement of the ejector pin retainer plate 119 and back-up plate 121 relative to the lower die 56.

The uper ends of the ejector pins 117 engage the hardened sprue in the annular channel 35 surrounding each die block 69 and integral with the hardened formed key plug 141. The pins 117 raise the sprue and attached key plug 141 out of the passage or cavity 72 where the articles can be removed in any suitable manner and transferred to another station where the sprue is removed along with any flash formed on the key plug 141. The push-back pins 122 are also projected above the surface 61 of the lower die 56 to be contacted by the lowered portion 27 in the next casting operation.

Although the dies are shown as having six die cavities in the illustrative embodiment, it is contemplated that the dies 19 and 56 could be provided with a different number including four or two die cavities as well. While a die casting apparatus of a particular and effective shape has been shown and described by way of illustration, it is not my intent or desire to unnecessarily restrict the improvement by virtue of this limited showing. It is also contemplated that specific descriptive terms employed herein be given the broadest possible interpretation consistent with the actual disclosure.

Having thus disclosed my invention, I claim:

1. A die casting apparatus comprising an upper die having a central opening and a plurality of radially extending sprue runners therefrom, a head core adjacent the outer end of each sprue runner and having a circular mold recess, said head core having an annular channel substantially surrounding said circular recess and communicating with said sprue runner and shallow radial channels between said annular channel and said circular recess, a lower die including a central tapered sprue post extending upward to enter the central opening in the upper die, a plurality of die blocks corresponding to the head cores each having a die cavity therein, a reciprocable retainer plate below the lower die, a plurality of ejector pins carried by said retainer plate and extending upward parallel to but offset from said die cavity and extending through each die block and aligned with and opening into said annular channel, and push-back pins carried by said retainer plate and extending through said lower die, said push-back pins being normally flush with the upper surface of the lower die.

2. A die casting apparatus comprising an upper die having a central opening and a plurality of radially extending sprue runners therefrom, a head core adjacent the outer end of each sprue runner having a circular recess, a centrally positioned plate in each head core having the configuration of a key section for forming a keyway, said head core having an annular channel substantially surrounding said circular recess and communicating with said sprue runner and shallow radial channels between said annular channel and said recess, a plurality of camming pins adjacents each head core and intermediate the head cores, and a lower die including a central tapered sprue post extending upward to enter the central opening in the upper die, a plurality of die blocks corresponding to the head cores, and having a generally cylindrical die cavity therethrough, a rear core secured in the end of the die cavity opposite the head core, a reciprocable core entering the die block in a radial direction, a pair of oppositely disposed reciprocable cores each removed 90° from said radially reciprocable core, an actuator block connected to each of said reciprocable cores and actuated by one of said camming pins, and a radially reciprocable cam lock having camming edges engageable with a pair of adjacent actuator blocks of said opposed cores to lock the cores in operative position, said cam locks being actuated by said camming pins intermediate the head cores.

3. A die casting apparatus as set forth in claim 2, including ejector pins extending through the die block parallel to but offset from the central opening therein and aligned with said annular channel to eject the sprue runner and attached formed article.

4. A die casting apparatus as set forth in claim 3, including a recoprocable ejector pin retainer plate below the lower die carrying said ejector pins, and push-back pins secured to the retainer plate and having upper ends normally flush with the upper surface of the lower die.

5. A die casting apparatus as set forth in claim 4, in which the upper ends of said push-back pins extend above the surface of the lower die when the formed article is ejected, and when the dies are closing, the upper die engages said push-back pins to retract the ejector pins and retainer plate.

6. A die casting apparatus having a stationary platen and a reciprocable platen, comprising an upper die on the stationary platen and having a central opening communicating with a source of molten metal, said upper die including a central lowered portion having a plurality of circumferentially spaced pockets adjacent the outer edge thereof, a head core secured in each pocket with the surface of the head core flush with the surface of the central portion, each pocket being a circular recess and a centrally positioned plate therein defining the keyway of a key plug, said central portion having a plurality of sprue runners radiating from the central opening to each head core, and depending camming pins adjacent the head cores and also intermediate adjacent head cores, a lower die secured to the reciprocable platen and including a plurality of die blocks corresponding to and aligned with the head cores and each having a central cylindrical die cavity therethrough, a retainer block secured to the upper surface of the die and having a central recess receiving the central portion of the upper die, a rear core mounted within the end of the die cavity opposite the head core, a radially reciprocable side core in each die block, and a pair of opposed cores reciprocable transversely to the side core in the die block, actuator blocks secured to the side core and cores, a radially reciprocable cam lock in the lower die intermediate adjacent die cavities and having camming edges engageable with the rear ends of adjacent actuator blocks for the cores of adjacent cavities when the cores are reciprocated into the die cavities, said actuator blocks and cam locks having slanted passages receiving said camming pins to actuate said actuator blocks and cam locks as said dies are moved together and apart, and ejector pins adjacent each die cavity to eject the cast article and sprue from the lower die.

7. A die casting apparatus as set forth in claim 6, in which said lower die is spaced from said platen, and an ejector pin retainer plate carrying said ejector pins is positioned between said lower die and said platen for reciprocable movement.

8. A die casting apparatus as set forth in claim 7, including a plurality of push-back pins carried by said ejector pin retainer plate and normally being flush with the top of the lower die.

9. A die casting apparatus as set forth in claim 6, in which each sprue runner terminates in a substantially annular channel around the die cavity and shallow radial channels extend between the annular channel and the die cavity.

10. A die casting apparatus as set forth in claim 6 including a tapered sprue post anchored to the lower die and extending upward to enter the central opening in the upper die.

11. A die casting apparatus as set forth in claim 6, including side core stops on the periphery of said lower die radially aligned with each side core and cam lock stops alternately arranged on the periphery of the lower die and radially aligned with each reciprocable cam lock.

12. A die casting apparatus as set forth in claim 11, including die locks on the periphery of the upper die corresponding to and adapted to engage the outer end of each side core actuator block, and cam locks arranged alternately on the periphery of the upper die corresponding to and adapted to engage the outer end of each reciprocable cam lock.

References Cited
UNITED STATES PATENTS

| | | |
|---|---|---|
| 2,783,502 | 3/1957 | Abplanalp. |
| 2,994,921 | 8/1961 | Hultgren. |
| 3,226,771 | 1/1966 | Szugda. |
| 3,283,373 | 11/1966 | Kiefer et al. |

J. SPENCER OVERHOLSTER, *Primary Examiner.*

R. D. BALDWIN, *Assistant Examiner.*